(12) United States Patent
Kaiser

(10) Patent No.: US 11,273,735 B2
(45) Date of Patent: Mar. 15, 2022

(54) CHILD SAFETY SEAT WITH BELTED PIVOT LINK

(71) Applicant: Britax Römer Kindersicherheit GmbH, Leipheim (DE)

(72) Inventor: Thomas Kaiser, Laupheim (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 0 days.

(21) Appl. No.: 17/155,305

(22) Filed: Jan. 22, 2021

(65) Prior Publication Data
US 2021/0138936 A1 May 13, 2021

Related U.S. Application Data

(63) Continuation of application No. 16/225,661, filed on Dec. 19, 2018, now Pat. No. 10,899,252.

(30) Foreign Application Priority Data

Dec. 21, 2017 (EP) .................................... 17209564

(51) Int. Cl.
*B60N 2/28* (2006.01)
(52) U.S. Cl.
CPC ......... *B60N 2/2806* (2013.01); *B60N 2/2821* (2013.01); *B60N 2/2884* (2013.01); *B60N 2002/2818* (2013.01)
(58) Field of Classification Search
CPC .. B60N 2/2884; B60N 2/2821; B60N 2/2806; B60N 2002/2818; B60N 2002/2815; B60N 2/2803
See application file for complete search history.

(56) References Cited

U.S. PATENT DOCUMENTS

| 4,480,870 A | * | 11/1984 | von Wimmersperg | ...................... B60N 2/2809 297/216.11 |
| 4,640,545 A | * | 2/1987 | von Wimmersperg | ...................... B60N 2/2824 292/DIG. 22 |
| 5,462,333 A | * | 10/1995 | Beauvais | ............. B60N 2/3084 297/216.11 |
| 2009/0102253 A1 | * | 4/2009 | Forbes | ................. B60N 2/2821 297/216.11 |

FOREIGN PATENT DOCUMENTS

| DE | 3422695 A1 * | 12/1985 | ............. B60N 2/286 |
| DE | 10241766 A1 * | 3/2004 | ........... B60N 2/2863 |
| EP | 0403853 A2 * | 12/1990 | ........... B60N 2/2884 |

* cited by examiner

*Primary Examiner* — Milton Nelson, Jr.
(74) *Attorney, Agent, or Firm* — K&L Gates LLP

(57) ABSTRACT

The invention relates to a child safety seat adapted to be secured with a safety belt of a vehicle, comprising a seat shell for receiving a child; and a seat base for being placed on a seat of the vehicle. The seat base comprises a base member coupled to the seat shell; a pivoting component connected pivotably to the base member; and an engaging member configured to engage with the safety belt of the vehicle, wherein the engaging member is coupled to the pivoting component such that a movement of the engaging member in a certain direction relative to the base member causes the pivoting component to pivot away from the base member.

21 Claims, 5 Drawing Sheets

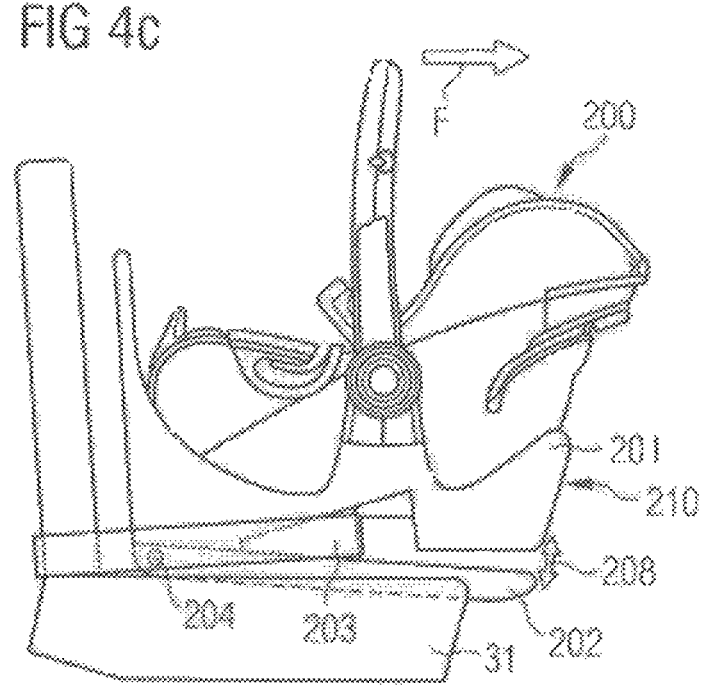
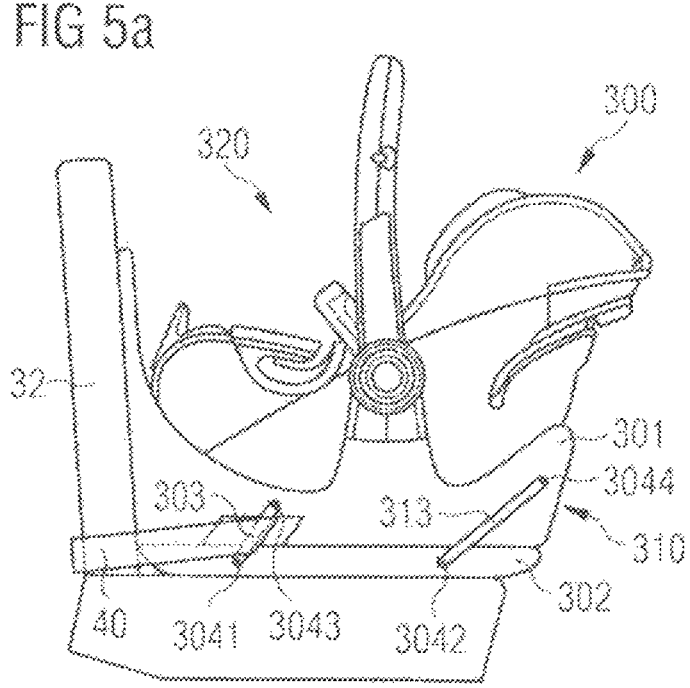

CHILD SAFETY SEAT WITH BELTED PIVOT LINK

PRIORITY CLAIM

The present application is a continuation of U.S. application Ser. No. 16/225,661, filed Dec. 19, 2018, now U.S. Pat. No. 10,899,252, which claims priority to EP Application No. 17209564.8, filed Dec. 21, 2017. The entire contents of each are incorporated herein by reference and relied upon.

DESCRIPTION

The invention relates to a child safety seat to be secured with a seat belt of a vehicle comprising a belted pivot link. The belted pivot link, in particular, allows for reduction of forward rotation of the child safety seat secured with the vehicle's seat belt in the case of a frontal impact of the vehicle.

Children, until they have reached a certain age or height, may not be secured in vehicles with the seat belts of the vehicle. Because of this, child safety seats must be used for safely transporting children in a vehicle. Smaller children, such as babies or toddlers, are held firmly in their safety seat mounted on a passenger seat of a vehicle with a special child restraint system, such as an integral harness system. For this age group, a safety seat with a 3-point or 5-point harness using a harness buckle as a coupling device is the safest way to travel. The 3-point or 5-point harness of the safety seat firmly secures shoulders and hips of the child in the seat.

Typically, child safety seats are mounted on a seat of the vehicle. The child safety seats are either secured by using the vehicle's seat belt so-called belted child safety seats, or by anchoring the child safety seat on the vehicle seat by using a particular anchoring mechanism, such as an Isofix system.

When using anchoring mechanisms, such as Isofix, the child safety seat is attached by means of rigid links or latches to respective anchorage units of the vehicle seats, such as loop mountings fixed in the vehicle. These anchoring mechanisms generally employ two anchorage units. The anchorage units, thus, define a lateral axis of the vehicle.

When using the vehicles's seat belt, specifically a lap belt portion of the seat belt, to secure the child safety seat in the vehicle, said lap belt portion similarly defines a lateral axis of the vehicle. As a consequence, in either case, the child safety seat tends to rotate about said lateral axis.

The rotation of the child safety seat about the above-mentioned lateral axis, either defined by the lap belt portion of the vehicle seat belt or by the anchorage units of the Isofix system, might provide a severe danger and risk of injuries for the child being secured in the child safety seat in the event of both a frontal collision or a rear-end collision. In the case of a frontal collision, for instance, the child safety seat is forced to rotate about the lateral axis, thereby being pressed downwards in the vehicle seat. With a forward facing child safety seat, the child sitting in the child safety seat, thus, experiences two rotations: the first is the rotation of the child secured in the child safety seat caused by the rotation of the child safety seat itself; the second is the tilting of the child's body relative to the child safety seat. Because of this, the child may be rotated forward to such an extent that he/she, specifically his/her head, hits the back of a front vehicle seat. Similar dangers and risks related to extensive forward rotation of the child safety seat may occur if the child safety seat is installed in rearward-facing direction.

In order to avoid unwanted rotation about the lateral axis when the child safety seat is secured to the vehicle by means of, e.g., the vehicle's seat belt of the vehicle or Isofix anchorage units, the child safety seat is additionally secured with a so-called anti-rotation device. In order to fulfil legislation, such an anti-rotation device is set as a standard requirement. According to UN ECE regulation 129 "i-Size", phase 3, however, an anti-rotation device is no more obligatory in connection with belted child safety seats. However, the requirements in terms of rotation of the belted child safety seat stay the same also with UN ECE regulation 129.

According to UN ECE regulation 129 it is mandatory to install child safety seats in rearward-facing direction until the child's age of 15 months. Because of this, the suppression of rotation of child safety seats when installed in rearward-facing direction in the vehicle becomes more and more important.

Different mechanisms for realizing such an anti-device exist. One such mechanism is the so-called top tether. This mechanism comprises a tether and a rigid point in the vehicle body. The tether may connect the rigid point to the top of the child safety seat, thereby preventing forward movement of the child safety seat relative to the vehicle seat in the case of a collision.

A second mechanism for suppressing the rotation of the child safety seat about the lateral axis is given by a support leg (also called load leg). A support leg for a child safety seat is a means to prevent the rotation of the child safety seat about the lateral axis in case of an impact. Typically, the support leg is attached to the front end of a seat base for a child safety seat. The support leg supports the seat base against being pressed downward into the vehicle seat in the case of a frontal accident.

Another mechanism for dealing with the rotation is the so-called "Isofix Pivoting Link", to which European patent no. 1090804 is directed. The mechanism using the Isofix pivoting link operates to control the movement of the child safety seat so that forward and rotational movement thereof is translated at least in part into (translatory) down-ward movement of the child safety seat into the vehicle seat. Thus, this mechanism reduces the overall tilting angle of the child in a frontal impact. EP 1090804 relies on the Isofix anchorage units. Therefore, the anti-rotation mechanism of EP 1090804 is not suitable for belted child safety seats.

It is, thus, an object of the present invention to provide an anchorage system for a belted child safety seat which reduces forward rotation of the child safety seat in the case of a frontal accident.

This object is achieved by the child safety seat according to claim 1. Further advantageous embodiments of the present invention are indicated in claims 2 to 14.

According to the present invention there is provided a child safety seat adapted to be secured with a safety belt of a vehicle, comprising a seat shell for receiving a child; and a seat base for being placed on a seat of the vehicle. The seat base comprises a base member coupled to the seat shell; a pivoting component connected pivotably to the base member; and an engaging member configured to engage with the safety belt of the vehicle. The engaging member is coupled to the pivoting component such that a movement of the engaging member in a certain direction relative to the base member causes the pivoting component to pivot away from the base member.

Preferably, the engaging member is configured to engage with the lap belt of the safety belt of the vehicle. The invention is, thus, particularly adapted for belted child safety seats.

Since the engaging member is coupled to the pivoting component such that a movement of the engaging member in a certain direction relative to the base member causes the pivoting component to pivot away from the base member, the center of gravity of the entire child safety seat changes its position relative to the axis defined by the portion of the safety belt of the vehicle engaging with the engaging member and, thus, securing the child safety seat to the vehicle seat. When the child safety seat is secured in the vehicle with the vehicle's safety belt, the portion of the vehicle's safety belt engaging with the engaging member defines a first pivoting axis of the child safety seat. The axis about which the pivoting component is pivotably connected to the base member defines a second pivoting axis of the child safety seat. In the case of a frontal impact, according to the invention there occur, thus, two coupled rotations about the first pivoting axis and the second pivoting axis which lead to a rotation of the child safety seat, on the one hand, but also to a translational movement of the child safety seat down into the seating portion of the vehicle seat. As a consequence of this downward movement, the seat cushion of the seating portion of the vehicle seat gets compressed almost parallel to the seating surface of the vehicle seat. A part of the forward rotation is, thus, translated into the downward translation. Therefore, less forward rotation of the child safety seats results. In this sense, the present invention is equipped with a rotation compensation mechanism. In other words, the ability of the pivoting component to rotate about a first pivoting axis defined by the lap belt portion engaging with the engaging member and the second pivoting axis of the base member introduces an additional degree of freedom of the motion of the child safety seat in the event of a frontal impact. The additional degree of freedom allows for a rotation of the base member, and thus, of the seat shell, relative to the pivoting member which is coupled to the safety belt of the vehicle.

The engaging member which is coupled to the pivoting component is configured to engage with the safety belt of the vehicle. The connection between the child safety seat and the vehicle for securing and installing the child safety seat in the vehicle is, thus, provided by the engaging member. Engaging member and pivoting component are, therefore, also termed as belted pivot link.

The base member is coupled to the seat shell. For this, the base member of the seat base may be separately formed from the seat shell; the base member may, however, also be integrally formed with the seat shell. Owing to the coupling of the base member to the seat shell, the relative movement of the base member with respect to the pivoting component is related to a respective relative movement of the seat shell with respect to the pivoting component.

Preferably, the child safety seat further comprises a spacing component coupled to the engaging member and configured to keep the engaging member at a predetermined minimal distance from the backrest portion of the vehicle seat when the child safety seat is installed in the vehicle. The spacing component aids the user to properly secure the child safety seat with the safety belt of the vehicle. Specifically, the spacing component prevents the pivoting component to pivot away from the base member under normal travelling conditions, that is, without the exertion of an extra force on the engaging member. For this, the spacing component preferably is configured to abut against the backrest portion of the vehicle seat when the child safety seat is properly installed in the vehicle. Thereby, relative movement of the engaging member is prevented under normal traveling conditions. Rotation of the child safety seat about the first pivoting axis defined by the lap belt portion engaging with the engaging member and the second pivoting axis about which the pivoting component is pivotably connected to the base member becomes effectively available only in the case of an impact. In the case of an impact, in particular, in the case of a frontal impact, the child safety seat travels a certain distance on the seating portion of the vehicle seat before the safety belt of the vehicles blocks. This distance is sufficient for releasing the spacing component from abutment against the backrest portion. As a consequence, the engaging member is free to move relative to the base member and to cause the pivoting component to pivot away from the base member. In other words, when a spacing component is used, the anti-rotation device/belted pivot link of the invention is activated in the event of an impact.

Advantageously, the relative movement of the engaging member is caused by a force exerted on the base member and pointing away from a backrest portion of the vehicle seat when the child safety seat is placed on the vehicle seat and when the engaging member engages with the safety belt of the vehicle. Preferably, the force is a force of inertia arising during a frontal impact of the vehicle. The anti-rotation mechanism/belted pivot link of the invention is configured such as to start properly working whenever the vehicle is involved in a frontal impact. In this event, the safety belt of the vehicle blocks. The force of inertia accelerates the remaining components of the child safety seat. Thus, the engaging member moves relative to the base member. In the case of an impact, the engaging member moves, with regard to the base member, in the direction of the backrest portion of the vehicle seat. By means of the coupling of the engaging member to the pivoting component the pivoting component pivots away from the base member. This allows for the two coupled rotations as described before to start. This leads to the suppression of the forward rotation of the child safety seat, as described above.

Advantageously, the pivoting component is rigidly formed. That is, the pivoting component has a certain rigidity and stiffness for ensuring that the child safety seat is securely coupled to the safety belt of the vehicle.

Preferably, the axis about which the pivoting component is pivotably connected to the base member is positioned at the portion of the seat base facing the backrest portion of the vehicle seat when the child safety seat is installed in the vehicle. This position makes it possible for the seat shell of the child safety seat to rotate such as to effectively compensate, at least in part, for the downward rotation in the case of a frontal impact. That is, by positioning the pivoting axis at the portion of the seat base facing the backrest portion of the vehicle seat, that is, at the rear side of the seat base, when the child safety seat is properly installed in the vehicle, in the case of an accident, the portions of the seat shell at the front side of the seat base rotate less toward the seating surface of the vehicle seat than the rear portions of the seat shell. By this, downward rotation is more effectively translated into downward translation.

Preferably, the pivoting component and the engaging member are integrally formed. This makes the manufacturing process easier.

Advantageously, the engaging member is positioned at a certain distance from the axis about which the pivoting component is pivotably connected to the base member. The distance between the engaging member and the pivoting axis at which the pivoting member is connected to the base member influences the overall movement of the child safety seat in the event of an accident. By choosing said distance properly it is possible to suppress the forward rotation to a higher extent. In addition to the distance of the engaging member, and, thus, the safety belt, from the pivoting axis, also the vertical distance of the center of gravity of the child safety seat from the pivoting axis influences the overall motion of the child safety seat. There-fore, by choosing the relation of said two distances properly, the translation of the downward rotation to downward translation is enhanced. Advantageously, the two distances are in the same range.

Advantageously, the engaging member comprises a belt guide, preferably a belt guide with a hook-shaped portion configured to receive a portion of the seat belt of the vehicle. The hook shape is particularly useful for securely guiding and receiving the safety belt of the vehicle. Advantageously, the belt guide may also comprise a belt clamp.

Advantageously, the force causes the engaging member to move closer to a plane comprising the center of gravity of the child safety seat and parallel to the lower surface of the seat base so as to reduce the vertical distance of the engaging member from the horizontal plane going through the center of gravity of the child safety seat. Therefore, e.g., in the case of a frontal impact, during said impact the lever arm related to the rotation of the child safety seat about the first pivoting axis defined by the lap belt portion engaging with the engaging member gets shorter and shorter. Because of this, downward movement of the child safety seat and, specifically, of the seat shell is initiated. By this, the child safety seat, specifically the seat base, is pressed down into the seating portion of the vehicle seat. This downward movement is almost parallel to the seating portion of the vehicle seat. Therefore, downward rotation is reduced, since the overall movement has, at least, partially been transformed into downward translatory movement.

According to some aspects of the invention, it is advantageous that the engaging member is located between the base member and the pivoting component. In this case, it might also be advantageous if the engaging member is movably coupled to the pivoting component so that movement of the engaging member towards the axis about which the pivoting component is pivotably connected to the base member causes the seat shell to pivot away from the pivoting component. It is further advantageous if the pivoting component extends over at least a part of the lower surface of the seat base. Preferably, the engaging member is wedge shaped or the engaging member comprises a hinging mechanism. Since the safety belt of the vehicle is located between the base member and the pivoting component, the vehicle is particularly securely coupled with the seat base. Furthermore, if the movement of the engaging member along the pivoting component is coupled to the pivoting of the seat shell away from the pivoting component, then there is a mechanism which compensates for the downward rotation of the child safety seat in the case of an accident. The engaging member, in this case, is configured such as to limit downward rotation of the center of gravity of the child safety seat by rotating the seat shell away from and upward with respect to the pivoting component. The pivoting component which preferably is at least a part of the lower surface of the seat base, is then, pressed down into the seating portion of the vehicle seat. Downward rotation of the child safety seat is, in this case, thus reduced by the upward rotation of the seat shell caused by the engaging member. The downward rotation caused by the vehicle accident and the upward rotation caused by the engaging member as described above partially compensate one another.

Specific embodiments of the invention will now be described by way of example and with reference to the accompanying drawings, in which:

FIGS. 4b and 4c are a sequence of the movement of the child safety seat in accordance with the second embodiment during a frontal impact of the vehicle;

FIG. 5a shows a side view of the child safety seat in accordance with the third embodiment of the invention installed in the vehicle under normal conditions;

Figure 1:
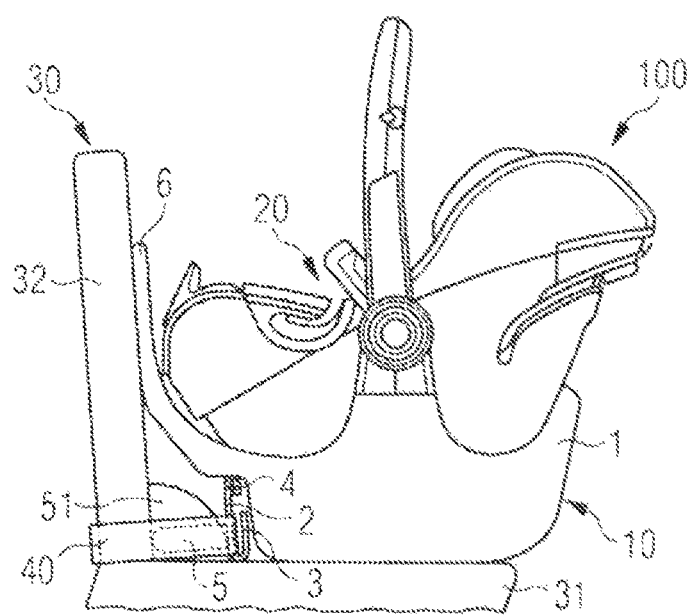
FIG. 1 shows a shows a side view of the first embodiment of the child safety seat of the invention under normal travelling conditions installed on a vehicle seat.

FIG. 1 shows a first embodiment of the child safety seat 100 of the present invention. The child safety seat 100 is shown to be secured by a lap belt 40 of the seat belt of a vehicle, and placed on the seating portion 31 of a vehicle seat 30. In FIG. 1 the child safety seat 100 is shown under normal travelling conditions. The child safety seat 100 comprises a seat shell 20 and a seat base 10. The seat base 10 comprises a base member 1, a pivoting component 2 and an engaging member 3. In the shown case, the seat shell 20 is an infant carrier which is releasably connected to the base member 1. It is, however, also possible that seat shell and seat base are integrally formed, or that the seat shell is tightly or non-removably attached to the seat base. The seat shell 20 is placed in rearward-facing direction, i.e., the child is positioned in the child safety seat in direction opposite to the normal driving direction. Further, it is shown that the seat base 1 also comprises a rebound bar 6. The rebound bar 6 extends vertically from the base member 1 of the seat base 10. The rebound bar 6 is configured to prevent the seat base 10 from bouncing back, that is, from upward rotation from the seating portion 31 of the vehicle seat 30, in the case of a frontal impact. The rebound bar 6 is further configured to prevent the seat base 10 from rotation in the case of a rear impact of the vehicle.

The pivoting component 2 is pivotably connected to the base member 1. The pivoting component 2 is connected to the base member 1 at a pivoting axis 4. The pivoting axis 4 is positioned at the rear side of the seat base 10, that is, at the portion of the seat base 10 which is facing the backrest portion 32 of the vehicle seat 30, when the child safety seat 100 is properly installed in the vehicle. Coupled to the pivoting component 2 there is an engaging member 3. In the embodiment shown in FIG. 1, the pivoting component 2 and the engaging member 3 are integrally formed. The engaging member 3 engages with the lap belt 40 of the safety belt of the vehicle. For this, the engaging member 3 is hook shaped. During the installation of the child safety seat 100 the lap belt 40 is fed through the hook. The hook functions, thus, as a belt guide. This allows for securing the child safety seat 100 by means of the safety belt of the vehicle. The pivoting component 2 and the engaging member 3 are, therefore, also denoted as belted pivot link.

Furthermore, there is a spacing component 5 attached to the engaging member 3. The spacing component 5 ensures that the engaging component 3 is kept at a predetermined position during installation of the child safety seat 100 and under normal conditions. Specifically, the spacing component 5 prevents the belted pivot link from rotation under normal conditions. As shown, the spacing component 5 abuts against the backrest portion 32 of the vehicle seat 30. This is to say that the belted pivot link is disabled under normal conditions. As will be described in more detail with respect to FIGS. 3a and 3b below, a frontal impact may serve as a trigger which activates the belted pivot link, i.e., which moves the child safety seat 100 sufficiently far away from the backrest portion 32 of the vehicle seat such that the engaging member 3 and, thus, the pivoting component 2 are allowed to rotate/pivot about the pivoting axis 4, and thus, to move relative to the base member 1. In the configuration shown in FIG. 1, that is, under normal conditions, the spacing component 5 is dimensioned such that the pivoting component 2 is substantially vertical with regard to the seating surface of the vehicle seat 30. The shaded circle sector 51 defines the minimal distance of the engaging member 3 from the intersection of the seating portion 31 and the backrest portion 32 of the vehicle seat 30. Said minimal distance 51 is preferably 10 cm or larger.

Figure 2:
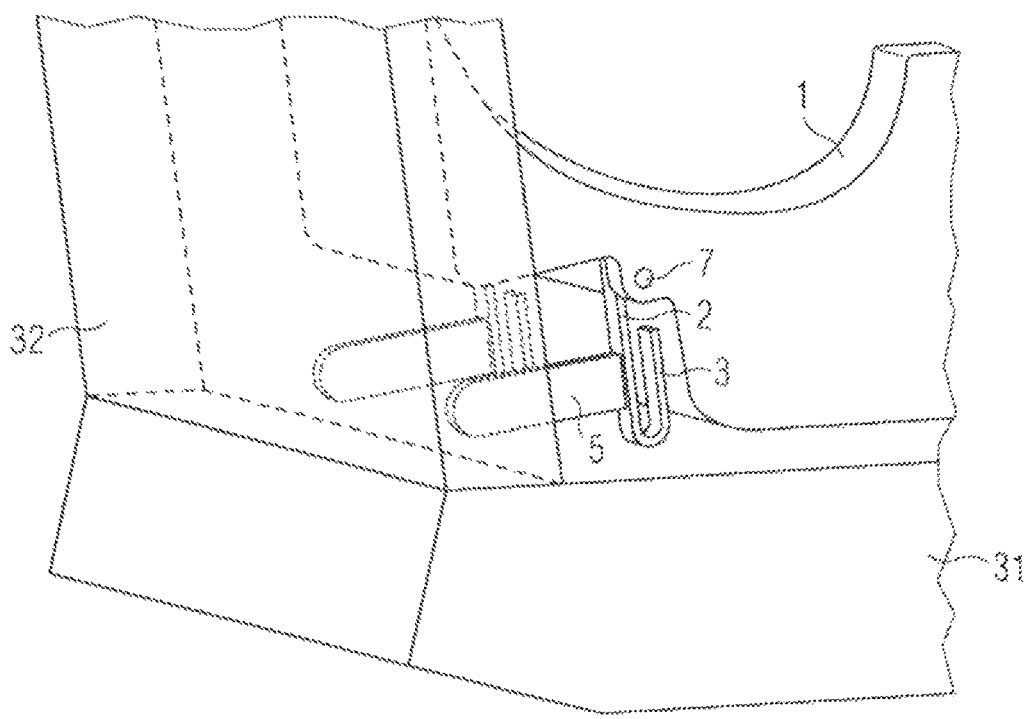
FIG. 2 is an enlarged perspective view of the belted pivot link of the child safety seat in accordance with the first embodiment.

FIG. 2 shows the belted pivot link of the first embodiment of the invention in greater detail. From FIG. 2 it becomes manifest that two belted pivot links are used. Each of the belted pivot links comprises a pivoting component 2, an engaging member 3, and a spacing component 5. The two belted pivot links are pivotably connected to the base member 1 of the seat base. In this case, a pivoting axle 7 is used. The pivoting axle 7 also defines the respective pivoting axis. The seat base is shown to be placed on the seating portion 31 of the vehicle seat. Furthermore, the spacing components 5 ensure that the engaging member 3 maintains a predetermined minimal distance from the back-rest portion 32 of the vehicle seat, as described already above in relation to FIG. 1.

Figure 3A:
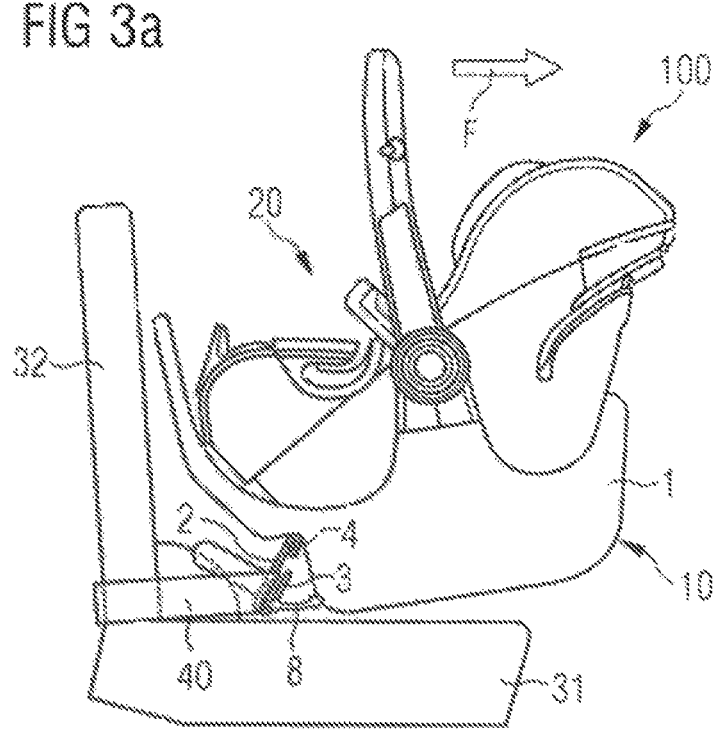
FIGS. 3a and 3b are a sequence of the movement of the child safety seat in accordance with the first embodiment during a frontal impact of the vehicle.
Figure 3B:
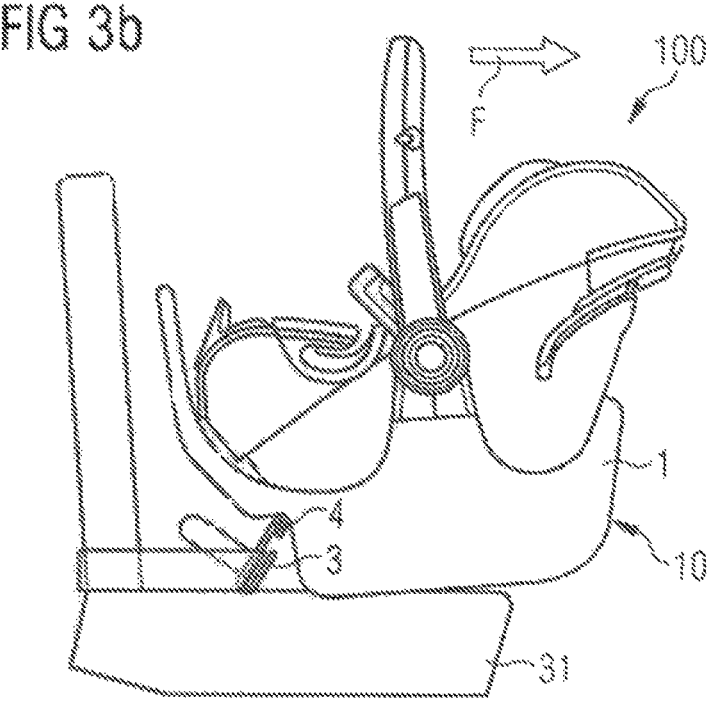

FIGS. 3a and 3b show the trajectory of the child safety seat 100 of the first embodiment during a frontal impact of the vehicle. During a frontal impact, the child safety seat 100 experiences a force of inertia F owing to the sudden deceleration of the vehicle. This force of inertia F drives the child safety 100 in the forward direction, as indicated by the arrow F in FIGS. 3a and 3b. That is, the child safety seat 100 is accelerated away from the backrest portion 32 of the vehicle seat.

The child safety seat 100 shown in FIGS. 3a and 3b comprises a spacing component 5 which is connected to the engaging member 3. As described previously with respect to FIG. 1, the spacing component 5 is configured to prevent rotation/pivoting of the engaging member 3 and the pivoting component 2 under normal travelling conditions. In the event of a frontal impact, the child safety seat 100 travels a certain distance on the seating portion 31 of the vehicle seat and away from the backrest portion 32. This is, because the lap belt 40 of the safety belt of the vehicle blocks only after a certain force/load is exerted on it. The distance is sufficiently large as to allow for rotation/pivoting of the engaging member 3 with the pivoting component 2 about the pivoting axis 4. That is, the distance is large enough so as to avoid abutment of the spacing component 5 against the backrest portion 32 of the vehicle seat. This can be expressed also as follows: the anti-rotation mechanism of the invention, i.e., the belted pivot link, is disabled when the child safety seat is installed in the vehicle and in use under normal conditions; in the case of an frontal impact, the anti-rotation mechanism/belted pivot link gets activated.

FIG. 3a shows the child safety seat 100 in an early stage of the frontal impact. There is basically no contact with the seating portion 31 of the vehicle seat. The child safety seat 100 is secured by means of a lap belt 40. It is assumed here that the lap belt 40 is already blocked by the force exerted on it. That is, the lap belt 40 is already exerting, in turn, a respective restraining force on the belted pivot link of the seat base 10. Specifically, the restraining force is exerted by the lap belt 40 on the engaging member 3. Since in the first embodiment the pivoting component 2 and the engaging member 3 are integrally formed, the same restraining force is exerted on the pivoting component 2. Because of this, the engaging member 3, and, thus, the pivoting component 2 is rotated away from the base member 1 of the seat base 10 upon movement of the base member 1. The engaging member 3 moves/rotates relative to the base member 1 in a direction towards the backrest portion 32. The rotation of the engaging member 3 and of the pivoting component 2 is about the pivoting axis 4. The rotation angle 8 of the pivoting component 2 relative to the base member 1 is also shown in FIG. 3a.

In addition to the rotation/pivoting of the pivoting component 2 away from and relative to the base member 1 about the pivoting axis 4, the pivoting component 2 rotates about an axis defined by the lap belt portion which is guided through the engaging member 3. Therefore, the child safety seat 100 performs two coupled rotations in the case of a frontal impact. This, in particular, allows for an upward rotation of the child safety seat 100. This is sketched in FIG. 3a. This means that the front part of the seat base and, thus, of the child safety seat 100, that is, the leading part with regard to the travelling direction, is at a raised position compared to the rear part of the seat base. This is possible because the base member 1 is allowed to rotate about the pivoting axis 4. Therefore, the force F acting on the center of gravity of the child safety seat causes the child safety seat to rotate upward with regard to the pivoting axis defined by the lap belt portion guided through the engaging member 3.

Furthermore, during the frontal impact, the pivoting component 2 is rotated farther and farther away from the base member 1. This rotation moves the engaging member 3 closer to a horizontal plane going through the center of gravity of the child safety seat 100. This implies that the lever arm related to the rotation of the child safety seat 100 about the pivoting axis defined by the lap belt 40 engaging with the engaging member 3 gets shorter and shorter. Therefore, the momentum which tries to rotate the child safety seat 100 is not constant, but it rather changes. The seat base 10 and the child safety seat 100 do not experience a mere rotation, but they are subjected to both a rotational and translational movement. In other words, a portion of the downward rotation is transferred into translational movement down into seating portion 31 of the vehicle seat.

FIG. 3b shows the child safety seat 100 at a later stage of the frontal impact, that is, at a stage later than that shown in FIG. 3a. The shortening of the lever arm during the rotation of the pivoting member 2 away from the base member 1, as described above in relation to FIG. 3a, initiates a downward movement of the child safety seat 100 toward the seating portion 31 of the vehicle seat. Once the lower surface of the seat base 10 touches the seating portion 31 of the vehicle seat, the respective seat cushion gets com-pressed. The downward movement creates an extensive compression of the seat cushion almost parallel to the surface of the seating portion 31. Consequently, the translational movement of the seat base 10 down into the seat cushion of the seating portion 31 reduces the forward rotational contribution to the overall movement of the child safety seat 100 during a frontal impact.

The extent to which the lower surface of the seat base 10 becomes parallel with regard to the seating surface of the vehicle seat depends, in particular, on the relation between the distance from the engaging member 3 to the pivoting axis 4 of the base member and the distance from the pivoting axis 4 of the base member to the center of gravity of the child safety seat 100.

Figure 4A:
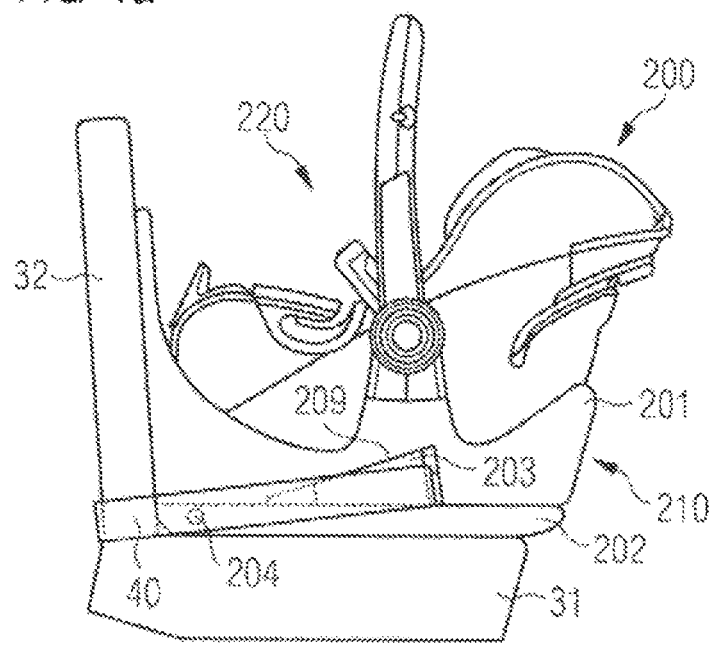
FIG. 4a shows a side view of the child safety seat in accordance with the second embodiment of the invention installed in the vehicle under normal conditions.

FIG. 4a shows a child safety seat 200 according to a second embodiment of the present invention. The child safety seat 200 is shown to be secured by a lap belt 40 of the seat belt of a vehicle, and placed on the seating portion 31 of a vehicle seat. In FIG. 4a the child safety seat 200 is shown under normal travelling conditions. The child safety seat 200 comprises a seat shell 220 and a seat base 210. The same as described with respect to the first embodiment, the seat shell 220 is placed in rearward-facing direction. The same as the seat base of the child safety seat of the first embodiment of the invention, described above in relation to FIGS. 1-3, the seat base 210 comprises a base member 201, a pivoting component 202 and an engaging member 203. The arrangement of the base member 201, the pivoting component 202, and the engaging member 203 differs, however, with respect to the first embodiment.

The pivoting component 202 is pivotably connected to the base member 201. In this embodiment, the pivoting component 202 provides the lower surface of the seat base 210. That is, the pivoting component 202 is or comprises the lower cover of the seat base 210. The pivoting component 202 comprises at least a portion which touches the upper surface of the seating portion 31 of the vehicle seat, when the child safety seat 200 is installed in the vehicle. The pivoting component 202 is connected to the base member 201 at a pivoting axis 204. The pivoting axis 204 is positioned at the rear side of the seat base 210, that is, at the portion of the seat base 210 which is facing the backrest portion 32 of the vehicle seat, when the child safety seat 200 is properly installed in the vehicle. The engaging member 203 is coupled to the pivoting component 202. According to the second embodiment shown in FIG. 4a, the engaging member 203 is moveable along the surface of the pivoting component 202 pointing towards the base member 201.

The engaging member 203 engages with the lap belt 40 of the safety belt of the vehicle. With regard to the second embodiment shown in FIG. 4a, the lap belt 40 is guided through the seat base 210 in a space located between the base member 201 and the pivoting component 202. Furthermore, said space is confined by the engaging member 203. The same as for the first embodiment, the pivoting component 202 and the engaging member 203 can, there-fore, also be denoted as a belted pivot link.

The engaging member 203 is wedge shaped. For instance, the engaging member 203 may be given by a ramp which is moveable along the pivoting component 202 and between the pivoting component 202 and the base member 203. The engaging member 203 is adapted to interact with a respective cut-out 209 of the base member 201. The cut-out 209 has an inclined surface matching the inclination of the wedge or ramp of the engaging member 203. Because of this, the engaging member 203 causes the base member 201 to rotate away from the pivoting component 202 when the engaging member 203 is driven closer to the pivoting axis 204. The maximal rotation or inclination angle of the base member 201 relative to the pivoting component 202 may be controlled by the dimensions of the engaging member 203 and the respective cut-out 209. In addition to the inclination angle of the wedge or ramp of the engaging member 203, in particular, the longitudinal extension of the engaging member 203, i.e., its extension in the normal travelling direction of the vehicle, when the child safety seat 200 is properly installed in the vehicle, determines the rotation of the base member 201 in the case of a frontal impact. Furthermore, the longitudinal extension of the engaging member 203 determines the minimal distance of the lap belt 40 engaging with the engaging member 203 from the backrest portion 32 of the vehicle seat. In this sense, the engaging member 203 comprises a spacing component.

Figure 4B:
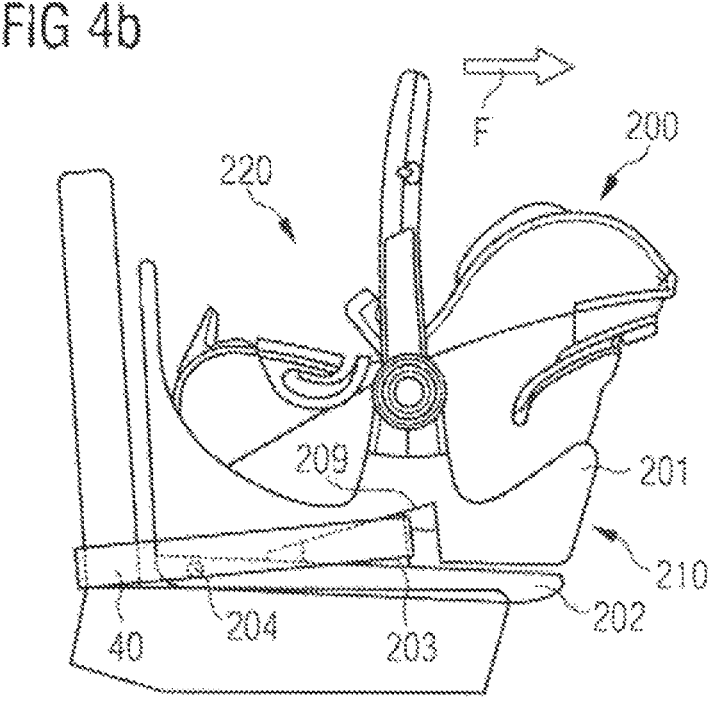

FIGS. 4b and 4c show the trajectory of the child safety seat 200 of the second embodiment during a frontal impact of the vehicle. Analogously to FIGS. 3a and 3b the force of inertia owing to the sudden deceleration of the vehicle acting on the child safety seat is denoted by F.

FIG. 4b shows the child safety seat 200 in an early stage of the frontal impact. The child safety seat 200 is secured by means of a lap belt 40. It is assumed here that the lap belt 40 is already blocked by the force exerted on it. That is, the lap belt 40 is already exerting, in turn, a respective restraining force on the belted pivot link of the seat base 210. Specifically, the restraining force is exerted by the lap belt 40 on the engaging member 203. Since in the second embodiment the engaging member 203 is moveable along the pivoting component 202 the restraining force retains the engaging member 203 while the other components of the child safety seat 200, such as the seat shell 220, base member 201, and pivoting component 202 are driven into forward direction by the force of inertia F. During this relative movement of the engaging member 203 with regard to the other components of the child safety seat 200, specifically with regard to the pivoting component 202 and the base member 201, the base member 201 rotates away from the pivoting component 202. The rotation occurs about the pivoting axis 204. The wedge or ramp of the engaging member 203 interacts with the cut-out 209 of the base member 201 such as to move apart the base member 201 and the pivoting component 202. Because of this, the relative rotation of the base member 201 away from the pivoting component 202 creates an upward rotation of the seat shell 220 of the child safety seat 200 which is opposite to the downward rotation about the axis defined by the lap belt portion engaging with the engaging member 203. The upward rotation, thus, compensates, at least in part, for the downward rotation.

The same as described in detail with regard to the first embodiment of the invention, the upward and down-ward rotations are coupled to one another. This is equivalent to say that at least a portion of the downward rotation is transferred into a downward translation. Because of this, the child safety seat 200 is equipped with an anti-rotation mechanism.

FIG. 4c shows the child safety seat 200 at a later stage of the frontal impact, that is, at a stage later than that shown in FIG. 4b. In the shown configuration, the rotation angle 208 of the base member 201 relative to the pivoting component 202 has reached its maximal value. In this case, the wedge or ramp of the engaging member 203 abuts against the base member 201 such that further movement of the engaging member 203 towards the pivoting axis 204 is not possible any more. The pivoting component 202 is pressed down into the seating portion 31 of the vehicle seat. As described above with respect to the first embodiment, the downward movement creates an extensive compression of the seat cushion almost parallel to the surface of the seating portion 31. In terms of the second embodiments, this means that the more parallel the pivoting component 202 is depressed into the seating portion 31 of the vehicle seat, the more efficiently the forward rotation is suppressed.

FIG. 5a shows a third embodiment of the child safety seat 300 in accordance with the invention. The child safety seat 300 of the third embodiment is similar to the child safety seat of the second embodiment. In particular, for securing the child safety seat 300 in the vehicle, the lap belt 40 is guided through a space between the base member 301 and the pivoting component 302 of the seat base 310. The seat shell 320 is placed in rearward-facing direction.

According to the third embodiment, the pivoting component 302 is pivotably connected to the base member 301 by means of a two hinges 303 and 313. The hinges 303 and 313 are preferably kinematic hinges. The hinge 303 is connected to the pivoting component 302 at the pivoting axis 3041, and it is connected to the base member 301 at the pivoting axis 3043. The hinge 313 is connected to the pivoting component 302 at the pivoting axis 3042, and it is connected to the base member 301 at the pivoting axis 3044. The hinge 303 is the engaging member 303 of the seat base 310 of the child safety seat 300. As can be seen from FIG. 5a, the lap belt 40 abuts on the hinge 300. The hinge/engaging member 303 and the hinge 313 are configured such that a relative movement of the pivoting component 302 and the base member 301 causes the base member 301 to pivot away from the pivoting component 302 in such a way that the front part of the base member 301, i.e., the part which is farther away from the backrest portion 32 of the vehicle seat, moves faster than the rear part of the base member 301, i.e., the part which is closer to the backrest portion 32. This movement has the effect of an upward rotation of the base member 301 relative to the pivoting component 302. Such a movement can be achieved, e.g., by choosing the pivoting axes 3041, 3042, 3043, and 3044, as well as the length of the hinge/engaging member 303 and hinge 313 accordingly.

The functioning of the anti-rotation mechanism of the third embodiment is, thus, similar to that of the second embodiment. In order to provide the upward rotation of the base member 301 and the seat shell 320 in the case of an impact, a hinging mechanism is used, however, instead of a wedge or ramp.

Figure 5B:
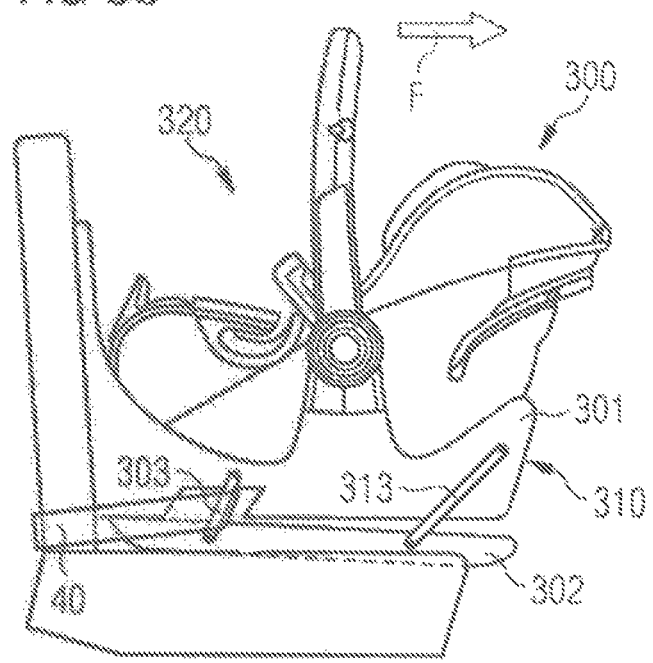
FIGS. 5b and 5c are a sequence of the movement of the child safety seat in accordance with the third embodiment during a frontal impact of the vehicle.
Figure 5C:
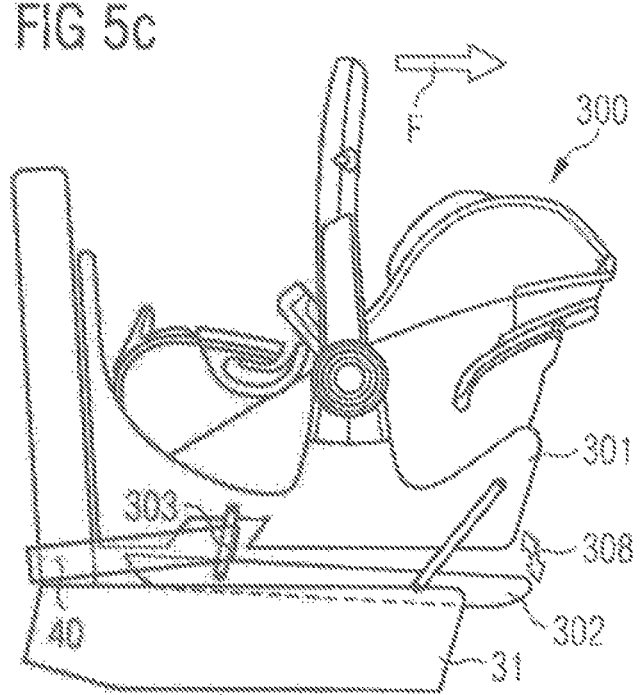

FIGS. 5b and 5c show the trajectory of the child safety seat 300 of the third embodiment during a frontal impact of the vehicle. Analogously to FIGS. 4b and 4c the force of inertia owing to the sudden deceleration of the vehicle acting on the child safety seat is denoted by F.

FIG. 5b shows the child safety seat 300 in an early stage of the frontal impact. The child safety seat 300 is secured by means of a lap belt 40. It is assumed here that the lap belt 40 is already blocked by the force exerted on it. That is, the lap belt 40 is already exerting, in turn, a respective restraining force on the belted pivot link of the seat base 310. Specifically, the restraining force is exerted by the lap belt 40 on the engaging member 303. Since in the third embodiment the engaging member 303 is a hinge pivotably connecting the pivoting component 302 and the base member 301 the restraining force tilts engaging member 303 in a more upright position while the other components of the child safety seat 300, such as the seat shell 320, base member 301, and pivoting component 302 are driven into forward direction by the force of inertia F. During this relative movement of the engaging member 303 with regard to the other components of the child safety seat 300, specifically with regard to the pivoting component 302 and the base member 301, the base member 301 pivots away from the pivoting component 302. Said movement of the base member 301 and the pivoting component 302 leads to tilt or to rotate the hinge/engaging member 303 into an upright position. This implies that the distance between the base member 301 and the pivoting component 302 gets larger. As described before, the hinge/engaging member 303 and the hinge 313 are configured such that the front part of the base member 301 moves faster away from the pivoting component 302 than the rear part of the base member 301. This leads to a combined rotational and translational movement of the base member 301 relative to the pivoting component 302.

This movement compensates, at least in part, the downward rotation of the child safety seat 300 about the axis defined by the lap belt portion engaging with the engaging member 303. Said compensation occurs analogously to that described above in relation to the second embodiment.

FIG. 5c shows the child safety seat 300 at a later stage of the frontal impact, that is, at a stage later than that shown in FIG. 5b. In the shown configuration, the rotation angle 308 of the base member 301 relative to the pivoting component 302 has substantially reached its maximal value. In this case, the base member 303 is close to abutting the pivoting member 302, and the hinge/engaging member 303 is in a substantially upright position. The pivoting component 302 is pressed down into the seating portion 31 of the vehicle seat. As described above with respect to the second embodiment, that the more parallel the pivoting component 302 is depressed into the seating portion 31 of the vehicle seat, the more efficient the suppression of the forward rotation gets.

Although in the embodiments presented before the child safety seat was shown to be installed in rearward-facing direction, i.e., the child is positioned in the child safety seat in direction opposite to the normal driving direction, the invention can equally be used for child safety seats installed in forward-facing direction, i.e., when the child is positioned in the child safety seat in direction of the normal driving direction.

LIST OF REFERENCE NUMERALS 100 child safety seat of the first embodiment
10 seat base of the child safety seat 100
1 base member of the seat base 10
2 pivoting component of the seat base 10
3 engaging member of the seat base 10
4 pivoting axis of the child safety seat 100
5 spacing component of the child safety seat 100
51 circle sector indicating the minimal distance of the engaging member 3 from the intersection of the seating portion 31 and the backrest portion 32
6 rebound bar of the child safety seat 100
7 pivoting axle of the child safety seat 100
8 rotation angle of the pivoting component 2 relative to the base member 1
20 seat shell of the child safety seat 100
200 child safety seat of the second embodiment
210 seat base of the child safety seat 200
201 base member of the seat base 210
202 pivoting component of the seat base 210
203 engaging member of the seat base 210
204 pivoting axis of the child safety seat 200
208 rotation angle of the pivoting component 202 relative to the base member 201
209 cut-out of the base member 201
220 seat shell of the child safety seat 200
300 child safety seat of the third embodiment
310 seat base of the child safety seat 300
301 base member of the seat base 310
302 pivoting component of the seat base 310
303 hinge/engaging member of the seat base 310

313 hinge of the seat base 310
3041 pivoting axis of the engaging member 303 at the pivoting component 302
3042 pivoting axis of the hinge 313 at the pivoting component 302
3043 pivoting axis of the engaging member 303 at the base member 301
3044 pivoting axis of the hinge 313 at the base member 301
308 rotation angle of the pivoting component 202 relative to the base member 201
320 seat shell of the child safety seat 200
30 vehicle seat
31 seating portion of the vehicle seat 30
32 backrest portion of the vehicle seat 30
40 lap belt
F force of inertia The invention is claimed as follows:

1. A child safety seat adapted to be secured with a safety belt of a vehicle in a rearward-facing direction relative to a direction of travel of the vehicle, the child safety seat comprising:
a seat shell for receiving a child; and
a seat base for being placed in the rearward-facing direction on a seat of the vehicle, wherein the seat base includes:
a base member coupled to the seat shell,
a pivoting component pivotably connected to an exterior surface of the base member, and
an engaging member configured to engage with the safety belt of the vehicle such that a force applied to the engaging member by the safety belt causes the base member to pivot away from the pivoting component thereby generating a gap between a portion of the base member and a portion of the pivoting component.

2. The child safety seat of claim 1, wherein the pivoting component contacts the seat when the seat base is placed on the seat of the vehicle.

3. The child safety seat of claim 1, wherein the force applied to the engaging member by the safety belt is applied in a direction substantially opposite the direction of travel of the vehicle.

4. The child safety seat of claim 1, wherein the engaging member is wedge-shaped.

5. The child safety seat of claim 1, wherein the force applied to the engaging member by the safety belt causes the engaging member to move or rotate towards a backrest of the seat when the child safety seat is installed in the vehicle.

6. The child safety seat of claim 1, wherein the engaging member is pivotably connected to the base member at a first pivot point and pivotably connected to the pivoting component at a second pivot point.

7. The child safety seat of claim 1, further comprising a hinge pivotably connected to the base member and to the pivoting component.

8. A child safety seat adapted to be secured with a safety belt of a vehicle in a rearward-facing direction relative to a direction of travel of the vehicle, the child safety seat comprising:
a seat shell for receiving a child; and
a seat base for being placed in the rearward-facing direction on a seat of the vehicle, wherein the seat base includes:
a base member coupled to the seat shell, the base member including a cut-out portion having a first inclined surface,
a pivoting component pivotably connected to an exterior surface of the base member at a pivot point, and
an engaging member positioned within the cut-out portion of the base member, the engaging member including a second inclined surface configured to interface with the first inclined surface of the cut-out portion,
wherein a movement of the engaging member in a first direction relative to the base member causes the base member to pivot away from the pivoting component.

9. The child safety seat of claim 8, wherein the engaging member is configured to engage with the safety belt of the vehicle such that a force applied to the engaging member from the safety belt causes the engagement member to move in the first direction.

10. The child safety seat of claim 9, wherein the engaging member is configured to engage with the safety belt such that, in the event of a frontal impact of the vehicle with the child safety seat installed in the vehicle, a length of the engaging member is proportional to a distance the child safety seat travels in the direction of travel of the vehicle prior to the safety belt applying the force to the engaging member.

11. The child safety seat of claim 8, wherein the pivot point is adjacent a backrest of the seat when the seat base is placed in the rearward-facing direction on the seat of the vehicle.

12. The child safety seat of claim 8, wherein the cut-out portion of the base member is located on the exterior surface of the base member.

13. The child safety seat of claim 8, wherein movement of the engaging member in the first direction includes the engagement member sliding along a surface of the pivoting component.

14. The child safety seat of claim 8, wherein the safety belt is positioned through the cut-out portion of the base member when the child safety seat is installed in the vehicle.

15. A child safety seat adapted to be secured with a safety belt of a vehicle in a rearward-facing direction relative to a direction of travel of the vehicle, the child safety seat comprising:
a seat shell for receiving a child; and
a seat base for being placed in the rearward-facing direction on a seat of the vehicle, wherein the seat base includes:
a base member coupled to the seat shell,
a pivoting component,
an engagement member pivotably connected to the base member and to the pivoting component, and
a hinge pivotably connected to the base member and to the pivoting component,
wherein the engagement member is configured to engage with the safety belt of the vehicle such that a force applied to the engaging member by the safety belt causes the base member to pivot away from the pivoting component.

16. The child safety seat of claim 15, wherein the engagement member and the hinge are each kinematic hinges.

17. The child safety seat of claim 15, wherein the base member includes a cut-out portion through which the safety belt is positioned when engaged with the engagement member.

18. The child safety seat of claim 15, wherein the engagement member is pivotably connected to the base member and to the pivoting member, and the hinge is pivotably connected to the base member and to the pivoting component, such that the engagement member is at a greater angle relative to the pivoting component than the hinge.

19. The child safety seat of claim 15, wherein the engagement member is pivotably connected to the base member and to the pivoting member, and the hinge is pivotably connected to the base member and to the pivoting component, such that, in the event of a frontal impact of the vehicle with the child safety seat installed in the vehicle, the force applied to the engaging member by the safety belt causes a first portion of the base component near the hinge to separate from the pivoting component at a faster rate than a second portion of the base component near the engagement member.

20. The child safety seat of claim 15, wherein the engagement member is pivotably connected to the base member and to the pivoting member, and the hinge is pivotably connected to the base member and to the pivoting component, such that, in the event of a frontal impact of the vehicle with the child safety seat installed in the vehicle, the force applied to the engaging member by the safety belt causes the base member to move translationally and rotationally relative to the pivoting component.

21. A child safety seat adapted to be secured with a safety belt of a vehicle in a rearward-facing direction relative to a direction of travel of the vehicle, the child safety seat comprising:
    a seat shell for receiving a child; and
    a seat base for being placed in the rearward-facing direction on a seat of the vehicle, wherein the seat base includes:
        a base member coupled to the seat shell,
        a pivoting component pivotably connected to an exterior surface of the base member, and
        an engaging member configured to engage with the safety belt of the vehicle such that a force applied to the engaging member by the safety belt causes the base member to pivot away from the pivoting component,
    wherein the force applied to the engaging member by the safety belt causes the engaging member to move or rotate towards a backrest of the seat when the child safety seat is installed in the vehicle.

\* \* \* \* \*